United States Patent Office 3,243,300
Patented Mar. 29, 1966

3,243,300
METHODS OF MAKING ALCOHOLS FROM TUBERS
David Pelton Moore, Marlow, N.H.
(9210 Flower Ave., Silver Spring, Md.)
No Drawing. Filed May 4, 1965, Ser. No. 453,176
2 Claims. (Cl. 99—34)

The present invention relates to improvements in methods of making alcohol from tubers, one object of the invention being the provision of a liquor having the proper alcoholic content distilled from vegetables, such as carrots, parsnips and the like, and which will reduce the grain usage to a great extent.

Another object is the provision of a method of making such a spiritous liquor that secures from a given quantity of such vegetables a greater quantity of distilled liquor per acre than can be secured from rye, barley, wheat and/or corn.

The preferred vegetable is of the tuber family, and although the following description will relate preferably to the use of carrots, it is to be understood that other tuber vegetables carrying the proper amount of sugar and proteins, can be used.

As one example of the method the following steps and quantities are set forth, namely:

(1) The carrots with the tops are first stored in a damp place for not less than three days.

(2) The tops are removed to be used later, and the carrots are now masticated and boiled for three (3) hours to reduce to a paste.

(3) The juice is now pressed from the paste, and the pulp is put aside for later use.

(4) To this juice is added extract or syrup of hops, or hops per se, and the bulk is now boiled for not less than five (5) hours.

(5) While still hot, the liquid is decanted into a tub or vat, withholding some of the liquid for later use, as will be set forth, and when the bulk is down to about 66° Fahr., yeast is added, and the bulk is now permitted to ferment for forty-eight (48) hours.

(6) When mass is then at 58° Fahr., the same is syphoned to free the liquid of dregs.

(7) The liquid now has the above noted unfermented liquid added thereto, and the mass is then heated to 66° Fahr. and held thereat for twenty-four (24) hours, permitting further fermenting as the mass falls to about 58° Fahr.

(8) Decant in keg or vat, and let further ferment for three (3) days at temperatures between 44° and 46° Fahr.

(9) The liquor is now distilled to produce one hundred (100) proof, and can then be rectified as desired.

The stem and residue are mixed to make a hog and cattle food.

The quantities best used are say:
Carrots 200 lbs.;
Water 2,160 quarts—distilled or pure water, spring;
Yeast in liquid form 60 quarts;
Hop extract or hops to make 20 to 80 quarts.

The liquor removed in step 5, is about 20 to 25% of the whole, namely about 240 quarts.

The final fermented liquor will yield about 480 quarts of spirits or liquor of 100 proof.

In lieu of carrots, parsnips, sweet potatoes or yams, and certain of the tropical tubers, can be used; and the yield per acre of each of which is far greater than that of rye, barley, wheat and/or corn.

It has also been found that sugar beets will yield a pleasant distilled liquor in lieu of the carrots.

What is claimed is:

1. The herein described method of making a spiritous liquor, which consists of masticating a tuber, boiling in water to produce a paste, extracting the liquor from the same, adding to the liquid residue hops, boiling same for approximately five hours, adding yeast thereto and permitting to ferment for approximately forty-eight hours; syphoning to free liquid of solids; adding to the resultant liquid some of the liquid before fermenting and heating the bulk to about 66° F., for approximately 24 hours; decanting and permitting the resultant liquid to ferment for three days at temperatures between 44 and 46° F.; and distilling the final liquid to form an alcoholic beverage.

2. A method as claimed in claim 1 wherein the tuber employed is carrots.

References Cited by the Examiner

UNITED STATES PATENTS

| | | | |
|---|---|---|---|
| 857,224 | 6/1907 | Bolt | 195—31 |
| 1,267,081 | 5/1918 | Kazmann | 195—37 |
| 2,361,498 | 10/1944 | Richee | 195—37 |

A. LOUIS MONACELL, *Primary Examiner.*

D. M. STEPHENS, *Assistant Examiner.*